(12) United States Patent
Kyojima et al.

(10) Patent No.: US 7,165,176 B2
(45) Date of Patent: Jan. 16, 2007

(54) ACCESS PRIVILEGE AUTHENTICATION OF CLIENT COMPUTER FOR SERVICES PROVIDED BY SERVER COMPUTER

(75) Inventors: Masaki Kyojima, Tokyo (JP); Koji Takeda, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 735 days.

(21) Appl. No.: 10/014,362

(22) Filed: Dec. 11, 2001

(65) Prior Publication Data

US 2003/0084296 A1    May 1, 2003

(30) Foreign Application Priority Data

Jan. 11, 2001   (JP)   ............. P2001-003603

(51) Int. Cl.
*H04L 9/00*   (2006.01)
*G06F 7/04*   (2006.01)
*G06F 15/16*   (2006.01)

(52) U.S. Cl. .......... 713/156; 713/169; 713/170; 726/29; 709/229

(58) Field of Classification Search ......... 709/203, 709/217, 219, 225, 227, 229, 237; 713/201
See application file for complete search history.

(56) References Cited

U.S. PATENT DOCUMENTS

| | | | | |
|---|---|---|---|---|
| 6,085,249 A | * | 7/2000 | Wang et al. | ............. 709/229 |
| 6,199,113 B1 | * | 3/2001 | Alegre et al. | ............. 709/229 |
| 6,304,907 B1 | * | 10/2001 | Keronen et al. | ............. 709/229 |
| 6,487,667 B1 | * | 11/2002 | Brown | ............. 713/201 |
| 6,690,794 B1 | | 2/2004 | Terao et al. | |
| 6,721,886 B1 | * | 4/2004 | Uskela | ............. 713/168 |
| 2003/0115452 A1 | * | 6/2003 | Sandhu et al. | ............. 713/155 |

FOREIGN PATENT DOCUMENTS

| | | |
|---|---|---|
| JP | 11-31204 | 2/1999 |
| JP | 11-175474 | 7/1999 |
| JP | 11-234263 | 8/1999 |
| WO | WO 01/01644 A1 * | 1/2001 |

* cited by examiner

*Primary Examiner*—Krisna Lim
*Assistant Examiner*—Hassan Phillips
(74) *Attorney, Agent, or Firm*—Notaro & Michalos PC

(57) ABSTRACT

Access privileges of a client are authenticated without using user account data. If an RSA modulus and public key have been assigned to the requested web page, the access privilege authentication controller 105 calls the challenge generator 107 to generate a challenge and transmits this challenge to the client 201 via the I/O controller 102. Subsequently, the access privilege authenticator 104 waits for a response from the client 201 sent via the I/O controller 102. When a response is received from the client 201, the access privilege authentication controller 105 calls the access privilege verifier 108 to verify whether the response is correct. If the response is correct, data indicating that the access privileges have been successfully authenticated is outputted, thereby alloying the client to access the requested service.

8 Claims, 10 Drawing Sheets

ACCESS PRIVILEGE AUTHENTICATION OF CLIENT COMPUTER FOR SERVICES PROVIDED BY SERVER COMPUTER

BACKGROUND OF THE INVENTION

1. Field of the Invention

The present invention relates to an authentication technology enabling a server to verify whether a client connected to the server via a network has valid authorization to access services on the server.

2. Description of the Related Art

Most servers providing services to client computers that are connected thereto via a network have a process for determining, prior to providing these services, whether the client has proper access privileges for these services or whether the client computer is currently being operated by a user having proper access privileges for the services. This process is called client authentication.

Pages 353–359 of "Microsoft Internet Information Server Resource Kit" issued by Microsoft Corporation of the U.S. describe client authentication functions possessed by a Microsoft Internet Information Server (hereinafter abbreviated to IIS. "Microsoft" is a trademark of Microsoft Corporation). The IIS has a system for client authentication called Basic Authentication. In Basic Authentication, an account is assigned to the user who accesses a server using a client. The accounts of the users that are authorized to access files stored on the server are determined.

When receiving a request from a client for a file on the server, the server requests the user to input a user ID and password. Based on the inputted user ID and password, the server identifies the user's account, determines whether the requested file can be accessed by that account, and provides the requested file to the client computer when access is authorized.

Authentication methods such as Basic Authentication in IIS are extremely common. In fact, nearly all applications using the Web, whether via the Internet or an intranet, employ similar authentication methods with Basic Authentication for restricting user access.

The following two problems exist in client authentication using user accounts, such as Basic Authentication in IIS.

(1) Management of user accounts places heavy maintenance and operation cost on the server (2) User anonymity on the server end is not guaranteed Next, these problems will be described in greater detail.

In client authorization using user accounts, it is essential that the server can identify the user's account. This means that the server must manage the user accounts. Accordingly, the server must have a database for managing the accounts. This database must be modified daily in response to the addition and deletion of accounts, resulting in considerable maintenance and operating costs.

When many servers are performing the same client authorization process, a main server (account server) is provided for managing the user accounts. Each server refers to the main server for account information. This method requires increased communication costs and security problems between individual servers and the account server. In addition, users must reveal their accounts to the server. This means that the history of service usage by each user is exposed to the server.

Considering the innumerable cases of abusing private data collected on servers in today's society, it is inevitable that this method poses a large risk for users.

SUMMARY OF THE INVENTION

In actual fact, identifying user accounts is not essential for client authentication. The purpose of performing client authentication is simply to determine whether it is permissible to provide a service to the client requesting that service or to the user of that client. Identifying the user account is nothing more than a means to make that determination, not the objective.

According to the present invention, public keys are assigned to services provided to the clients. In order to determine whether or not to supply a service to a client or to a user of that client, the server executes a challenge/response exchange using a public key assigned to the requested service.

For example, when using the RSA (Rivest, Shamir, and Adleman) algorithm for public-key encryption a modulus n and public key e of the RSA key pair (public key e and private key d) are assigned to a service, and the private key d is distributed to all clients authorized to receive that service. When a client requests a service that has been assigned a modulus n and public key e, the server generates a random number C, called a challenge, and sends this value C to the client. The client uses the private key d it possesses to calculate a response according to Equation (1) and returns the result to the server. Here, either the server can transmit the modulus n to the client along with the challenge, or the modulus n can be distributed to the client along with the private key d. Since the modulus n is public data, this value can also be stored on a separate server accessible by anyone.

$$R = C^d \bmod n \tag{1}$$

After receiving a response, the server verifies whether Equation (2) is satisfied using the values for the challenge C sent to the client, the response R received from the client, and the modulus n and public key e assigned to the service.

$$C = R^e \bmod n \tag{2}$$

If the relationship in Equation (2) holds, the service is provided to the client. If not, the service is not provided.

In this method, the private key d serves as access privilege proving data to prove the access privileges of a client for the service assigned the modulus n and public key e. All users having the private key d can access services assigned the modulus n and public key e.

The same private key can serve to enable use of a plurality of services assigned the same modulus and public key. These can be thought of as a group of services that can be used according to the same access privileges, whether they are on the same server or completely different servers.

Conversely, a plurality of services, each assigned a different modulus and public key, can be thought to require different access privileges. With this method, the server need not identify the account of the user operating the client. A database for user accounts is unnecessary, and the server need not access an account server to identify a user account. Further, the user accounts are not made public to the server. In fact, in the challenge/response process, data identifying the user is never transmitted to the server side, thereby user's anonymity is completely protected.

RSA is not the only public-key encryption algorithm that can be used in the above method. It is possible to apply a challenge/response method using a signature, such as DSA (Digital Signature Algorithm). Another possible algorithm is one that requires commitment transmissions prior to the challenge/response change, such as Schnorr Signature Authentication Algorithm.

The problem with these methods is that the private key and modulus sent to the client as data for proving access privileges can be copied to another client, running the risk of the service being used dishonestly.

To solve these problems, the present invention assigns unique operations to each client. Access privilege proving data is created using this unique operation and the private key corresponding to the modulus and public key assigned to the desired service.

For example, access privilege proving data t is created as in Equation (3), where n is the modulus, e the public key, d the private key, and $f_U(\bullet)$ denotes the unique operation possessed by the client U. The calculated value t is provided to the client U. Here, "|" denotes bit concatenation.

$$t = d - f_U(n|e) \qquad (3)$$

When a request for a service assigned the modulus n and public key e is received from the client U, the server generates a challenge C and transmits this value to the client U. The client U calculates a response based on Equation (4) and returns this value to the server. Here, the server can transmit the modulus n and public key e to the client along with the challenge. The modulus n and public key can also be provided to the client in advance is together with the access privilege proving data t. Since it is public, the modulus n and public key e can also be stored on a separate server accessible by anyone.

$$R = C^t C^{f_U(n|e)} \qquad (4)$$

After receiving a response, the server verifies whether Equation (2) is satisfied using the values for the challenge C sent to the client, the response R received from the client, and the modulus n and public key e assigned to the service. If the relationship in Equation (2) holds, the service is provided to the client. If not, the service is not provided.

This method achieves the same functions as the method described above because services are not provided to any computer other than those clients having access privilege proving data assigned to the services. An advantage of this method is that access privilege proving data for one service is different for each client. Therefore, this access privilege proving data cannot be used dishonestly, even if the data is copied, providing the results of the unique operation $f_U(\bullet)$ are protected from accesses by the user of the client.

In the above-described method, the client performs the operation using access privilege proving data. However, the same effects can be achieved by configuring the server to use the access privilege proving data. The procedure used for this method is described next.

When a request for a service assigned the modulus n and public key e is received from the client U, the server generates a challenge C and transmits this value to the client U. The client U calculates a response based on Equation (5) and returns this value to the server along with the access privilege proving data t.

$$R = C^{f_U(n|e)} \qquad (5)$$

After receiving a response, the server verifies whether Equation (6) is satisfied using the values for the challenge C sent to the client, the response R and the access privilege proving data t received from the client, and the modulus n and public key e assigned to the service. If the relationship in Equation (6) holds, the service is provided to the client. If not, the service is not provided.

$$C \equiv C^t R \bmod n \qquad (6)$$

One method for generating the unique operation is to assign a common cryptographic hash function $f(\bullet)$ to all clients (for example, SHA-1) and to assign a different data u for each client, then performing the operation shown in Equation (7).

$$f_U(x) = f(x|u) \qquad (7)$$

It is also possible to use the client-specific data u itself as the result of the unique operation.

When it is desirable that the use of services provided by the server be limited by specified conditions, data describing usage conditions (conditions-of-use data) is used. For example, when restricting the time period in which the services can be used, the starting and ending times of use are described in the conditions-of-use data.

The access privilege proving data is then generated from a private key, a unique client-specific operation, and the conditions-of-use data. For example, if d is the private key, $f_U(\bullet)$ the unique operation, and L the conditions-of-use data, the access privilege proving data t is calculated as shown in Equation (8).

$$t = d - f_U(n|e|L) \qquad (8)$$

The access privilege proving data t and conditions-of-use data L are provided to the client in advance.

When a request for a service assigned the modulus n and public key e is received from the client U, the server generates a challenge C and transmits this value to the client U. First, the client evaluates the conditions of use described by L. If those conditions have been met, the client calculates a response based on Equation (9) and returns this value to the server.

$$R = C^t C^{f_U(n|e|L)} \qquad (9)$$

After receiving a response, the server verifies whether Equation (2) is satisfied using the values for the challenge C sent to the client, the response R received from the client, and the modulus n and public key e assigned to the service. If the relationship in Equation (2) holds, the service is provided to the client. If not, the service is not provided.

Using this method, the value of the response R changes when the conditions of use described by L are modified. As a result, Equation (2) is not satisfied. Accordingly, the user of the client can no longer overwrite L for the user's own benefit.

The methods described thus far assign a unique operation to the client. Since access privilege proving data is created based on this operation, different access privilege proving data is required for a different client, even when the user is the same. Further, it is difficult to control whether usage of services is permitted or not permitted among a plurality of users using the same client.

With such methods that assign unique operations to clients, it is difficult to implement access privilege control that truly binds to users. The present invention solves this type of problem by implementing a unique operation unit with a portable device, such as a smart card (an IC card with a calculating capacity). The user carries this portable device around and connects the device to the client to be used. This method achieves access privilege control that binds only to the user, regardless what client is being used.

The present invention can be implemented as a system or apparatus such as a server (server computer), a client, a computer system, and also implemented as a method. Obviously, at least a portion of this system can be implemented with a computer program. The client can be configured of a variety of data terminals, including a personal computer, workstation, portable terminal, set top box, home electric data appliance, and intelligent telephone (including portable telephones). The server can be a web server, FTP server, application server, or other server providing a variety of services.

The server and clients can be connected via a wired or wireless network employing such configurations as an IP network, a telephone network, or a mobile communication network. The Internet, intranets, extranets, and the like can be applied to suit various environments of use. The system can also employ communication channels using short-range radio waves, as in the Bluetooth (trademark) method. A device using short-range radio waves can be used as a client in this case.

A detailed description has been given above for the present invention, various aspects of which are described in the Claims. Next, preferred embodiments of the present invention will be described in detail.

DESCRIPTION OF THE PREFERRED EMBODIMENTS

An authentication technology according to preferred embodiments of the present invention will be described while referring to the accompanying drawings.

First Embodiment

The authentication technology of the first embodiment comprises a web server for providing web pages to clients and clients that receive web pages after requesting the web pages from the web server.

The web server of the present embodiment has an access privilege authentication mechanism applying the present invention. An RSA modulus and a public key are assigned to web pages on the web server when necessary. Web pages not assigned with these values are accessible by any client.

When a request is received from a client for a web page assigned an RSA modulus and public key, the web server executes a challenge/response exchange with the client to verify whether the client has access privileges for that page. The challenge/response is successful only when the client possesses access privilege proving data corresponding to the RSA modulus and public key that are assigned to the relevant web page. The requested web page is provided to the client only when this verification is successful.

The method of assigning the RSA modulus and public key values to web pages has a number of possible variations. For example, it is possible to associate an RSA modulus and public key to each web page. It is also possible to associate an RSA modulus and public key to a group of web pages listed in a directory or the like. When a request for any web page contained in this group of web pages is received, a challenge/response exchange is executed using the RSA modulus and public key that binds this group.

The clients of the present embodiment possess an access privilege proving mechanism applying the present invention. When a client receives a challenge from a web server in response to a web page request initiated by the client, the client can generate and return a response to the challenge.

The clients in the present embodiment are each assigned unique data. Access privilege proving data giving specific clients access to a certain web page is created from a private key corresponding to the RSA modulus and public key assigned to that web page, the unique data assigned to the client, and conditions-of-use data describing conditions in which use of the web page is permitted to clients. The conditions-of-use data includes a description of the starting and ending time and date for a period in which the client can access the web page.

As an example, let us say n and e are the RSA modulus and the public key assigned to the web page. d is the private key corresponding to n and e. u is the unique data assigned to the client, and L is the conditions-of-use data. In this example, the access privilege proving data t is calculated according to Equation (10) below.

$$t = d - f(n|e|L|u) \qquad (10)$$

Here, $f(\bullet)$ is a cryptographic hash function universally possessed by all clients.

Figure 1:
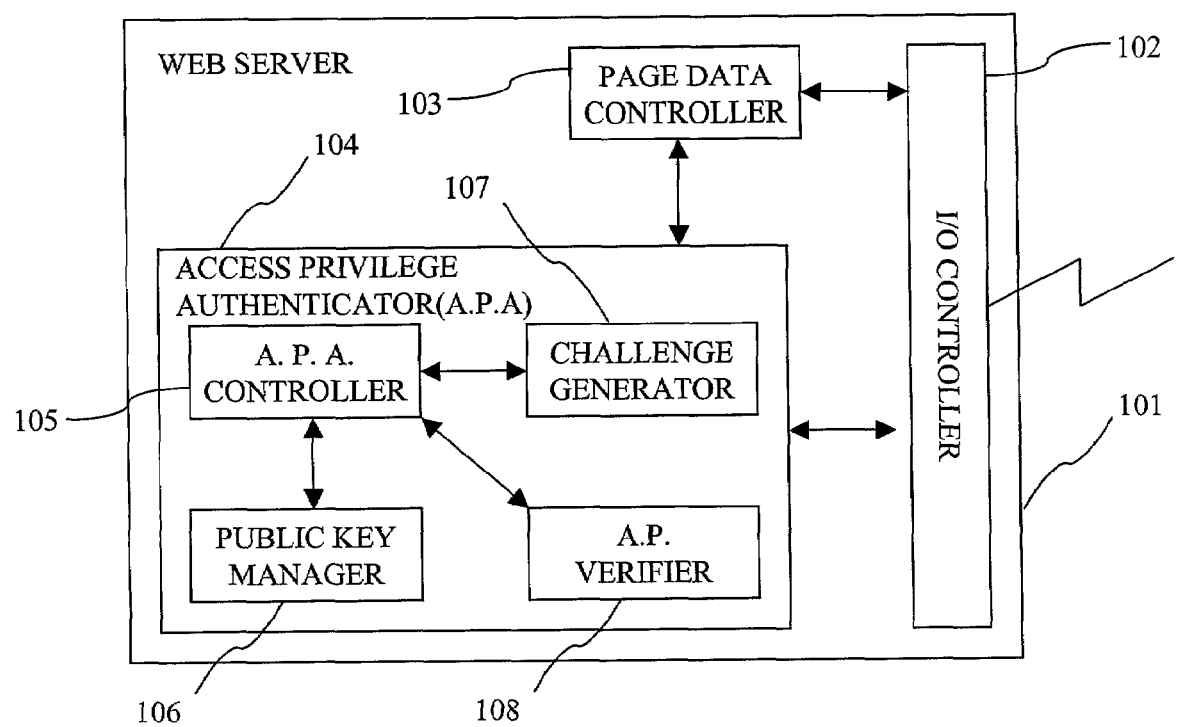
FIG. 1 is a block diagram showing the configuration of a web server according to a first embodiment of the present invention.

FIG. 1 shows the internal construction of a web server 101 according to the first embodiment of the present invention. The web server 101 includes an input/output (I/O) controller 102, a page data manager 103, and an access privilege authenticator 104.

The I/O controller 102 controls input received by the web server 101 from a client via a network and output transmitted from the web server 101 to a client via the network.

The page data manager 103 manages web pages on the web server. The page data manager 103 includes a function for supplying a web page via the I/O controller 102 in response to a request for the page from a client. When necessary, the page data manager 103 calls the access privilege authenticator 104 before supplying a web page in order to confirm whether the client has proper access privileges and can cancel provision of the web page when the client does not.

The access privilege authenticator 104 determines whether a client has proper access privileges in response to a call from the page data manager 103 and returns the result to the page data manager 103. During the determination process, the access privilege authenticator 104 communicates with the client via the I/O controller 102.

The access privilege authenticator 104 comprises an access privilege authentication controller 105, a public key manager 106, a challenge generator 107, and an access privilege verifier 108.

The access privilege authentication controller 105 controls the overall process for testing whether the client has proper user privileges.

The public key manager 106 stores and manages the bindings between the web pages and their corresponding assigned RSA modulus and public key.

The legitimacy of the client's access privileges is determined according to a challenge/response exchange conducted between the web server and the client. The challenge generator 107 generates a challenge that is transmitted to the client.

The access privilege verifier 108 determines whether the response received from the client has a prescribed relationship with the challenge generated by the challenge generator 107 and the RSA modulus and public key assigned to the web page that has been requested by the client. After this determination, the access privilege verifier 108 outputs the result of this determination.

Figure 2:
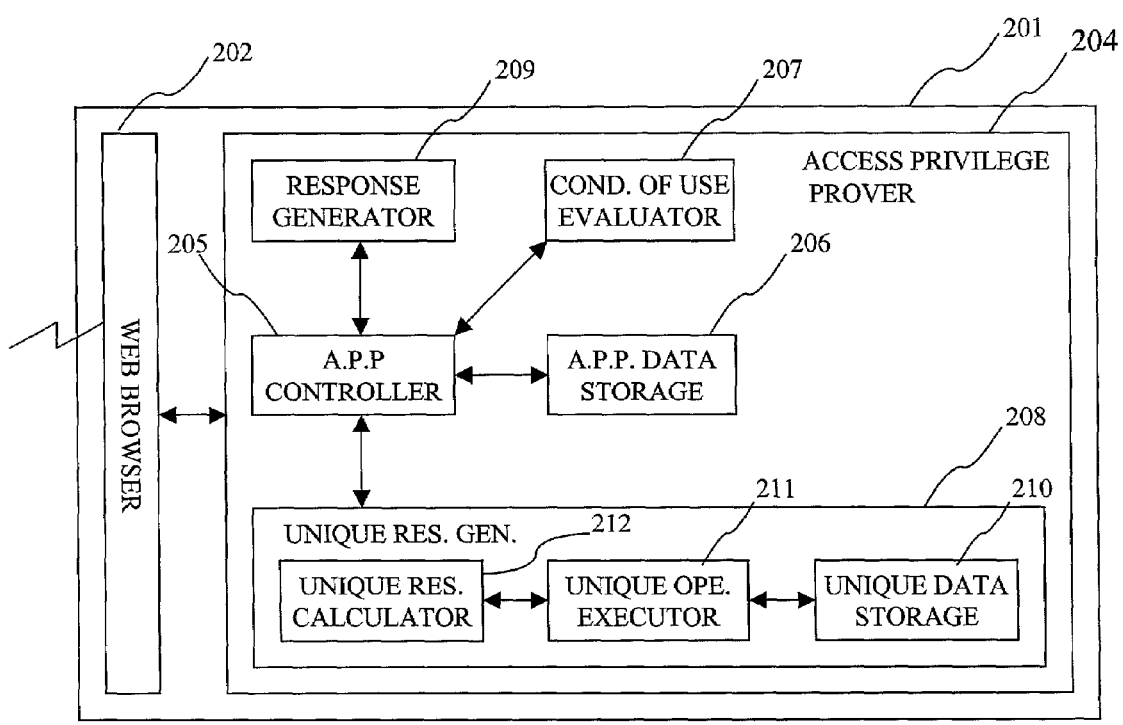
FIG. 2 is a block diagram showing the configuration of a client according to the first embodiment.

FIG. 2 shows the internal configuration of a client 201 according to the first embodiment of the present invention. The client 201 includes a web browser 202 and an access privilege prover 204.

The web browser 202 controls input to the client received from the web server via a network and output transmitted from the client to the web server via the network. The web browser 202 also serves to transmit requests for web pages to the web server and to process web pages received from the web server.

The access privilege provor 204 proves for the web server that the client has access privileges for a certain web page. When a challenge is received from the web server via the web browser 202 for verifying access privileges, the access privilege prover 204 calculates a response for proving its own access privileges and sends this response to the web server via the web browser 202.

The access privilege prover 204 comprises an access privilege proving controller 205, an access privilege proving data storage unit 206, a conditions-of-use evaluator 207, a unique response generator 208, and a response generator 209.

The access privilege proving controller 205 controls overall calculations of the response for proving access privileges of the client.

The access privilege proving data storage unit 206 stores access privilege proving data for web pages and is capable of storing multiple access privilege proving data. Each separate access privilege proving data is stored along with its RSA modulus, public key, and conditions-of-use data used in generating the access privilege proving data.

The conditions-of-use evaluator 207 determines whether or not the conditions of use described by the conditions-of-use data are met. The conditions-of-use data in the present embodiment describe the starting and ending time and date for a period in which the client can access the web page. The conditions-of-use evaluator 207 includes a function for determining whether the current time falls within the period during which the web page is accessible.

In the present embodiment, the generation of a response is divided into two stages: a calculation using unique data and a calculation using access privilege proving data. The unique response generator 208 executes the calculation using unique data.

The response generator 209 generates a response to be transmitted to the web server 101.

The unique response generator 208 comprises a unique data storage unit 210, a unique operation executor 211, and a unique response calculator 212.

The unique data storage unit 210 stores unique data assigned to the client.

The unique operation executor 211 is provided with a built-in cryptographic hash function $f(\cdot)$ possessed universally by all clients. The unique operation executor 211 executes this hash operation using the unique data stored in the unique data storage unit 210.

The unique response calculator 212 executes one stage of the response calculation for the response to be sent to the web server 101 using the results from the unique operation executor 211.

When the web server 101 receives a request for a web page from the client 201, the web server 101 transfers the request to the page data manager 103 via the I/O controller 102. The page data manager 103 calls the access privilege authenticator 104 in order to confirm that the client 201 has access privileges for the requested web page. When calling the access privilege authenticator 104, data such as a file name is transferred to the access privilege authenticator 104 in order to identify the requested web page.

The access privilege authenticator 104 determines whether the client 201 making the request possesses access privileges for the requested web page and transmits the results of this determination to the page data manager 103. If it is confirmed that the client has proper access privileges, the web page is transmitted to the client 201. If it is determined otherwise, an error message is returned to the client 201.

Figure 3:
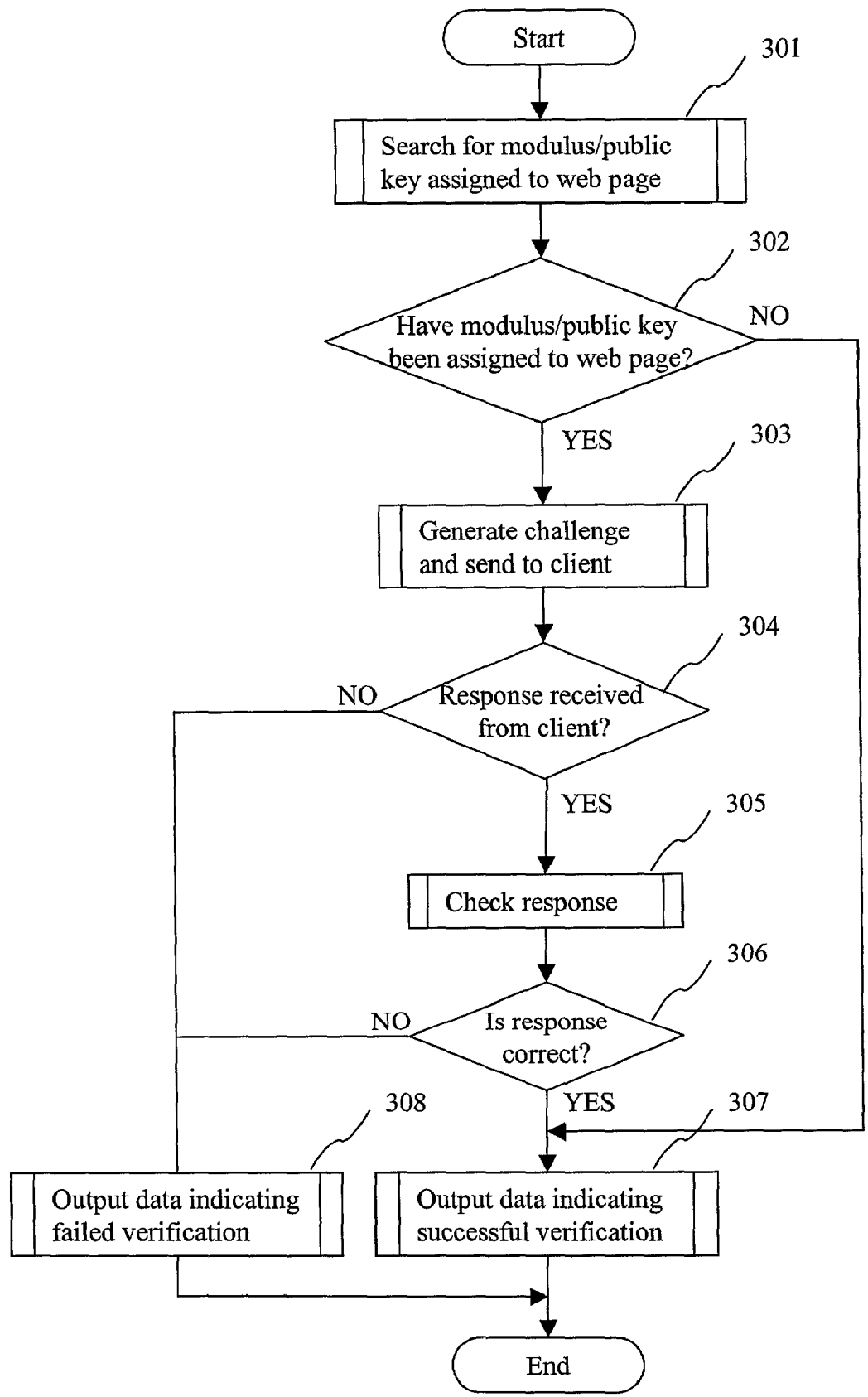
FIG. 3 is a flowchart illustrating the method of operations according to the first embodiment.

FIG. 3 is a flowchart showing the operations performed in the access privilege authenticator 104 when called by the page data manager 103. The procedure for verifying access privileges executed by the access privilege authenticator 104 will be described with reference to this flowchart.

The access privilege authentication controller 105 controls operations of the access privilege authenticator 104. The access privilege authentication controller 105 first calls the public key manager 106 in step 301 to search for an RSA modulus and public key assigned to the web page requested by the client 201. If an assigned RSA modulus and public key do not exist (No in 302), data indicating that access privileges have been successfully authenticated is output in step 307 and the process ends.

If an RSA modulus and public key have been assigned to the requested web page (Yes in 302), the access privilege authentication controller 105 calls the challenge generator 107 to generate a challenge and transmits this challenge to the client 201 via the I/O controller 102 in step 303. The access privilege authentication controller 105 also transmits the RSA modulus and public key assigned to the requested web page to the client 201 along with the challenge.

Subsequently, the access privilege authenticator 104 waits for a response from the client 201 via the I/O controller 102. If no response has been received after a fixed interval has passed since the challenge was transmitted (No in 304), data indicating that authentication of access privileges has failed is output in step 308 and the process ends.

When a response is received from the client 201 (Yes in 304), the access privilege authentication controller 105 calls the access privilege verifier 108 in step 305 to verify whether the response is correct. Here, the access privilege verifier 108 verifies whether Equation (2) is satisfied when the challenge sent to the client 201 in step 303 is C, the response received in step 304 is R, the RSA modulus assigned to the requested web page is n, and the public key is e. If Equation (2) is satisfied (Yes in 306), data indicating that access privileges have been successfully authenticated is output in step 307, and the process ends. If Equation (2) is not satisfied (No in 306), data indicating that verification of access privileges has failed is output in step 308, and the process ends.

Meanwhile, having received a challenge, RSA modulus, and public key from the web server 101 via the web browser 202, the client 201 transfers this data to the access privilege prover 204 to generate a response, then sends the response to the web server 101 via the web browser 202.

Figure 4:
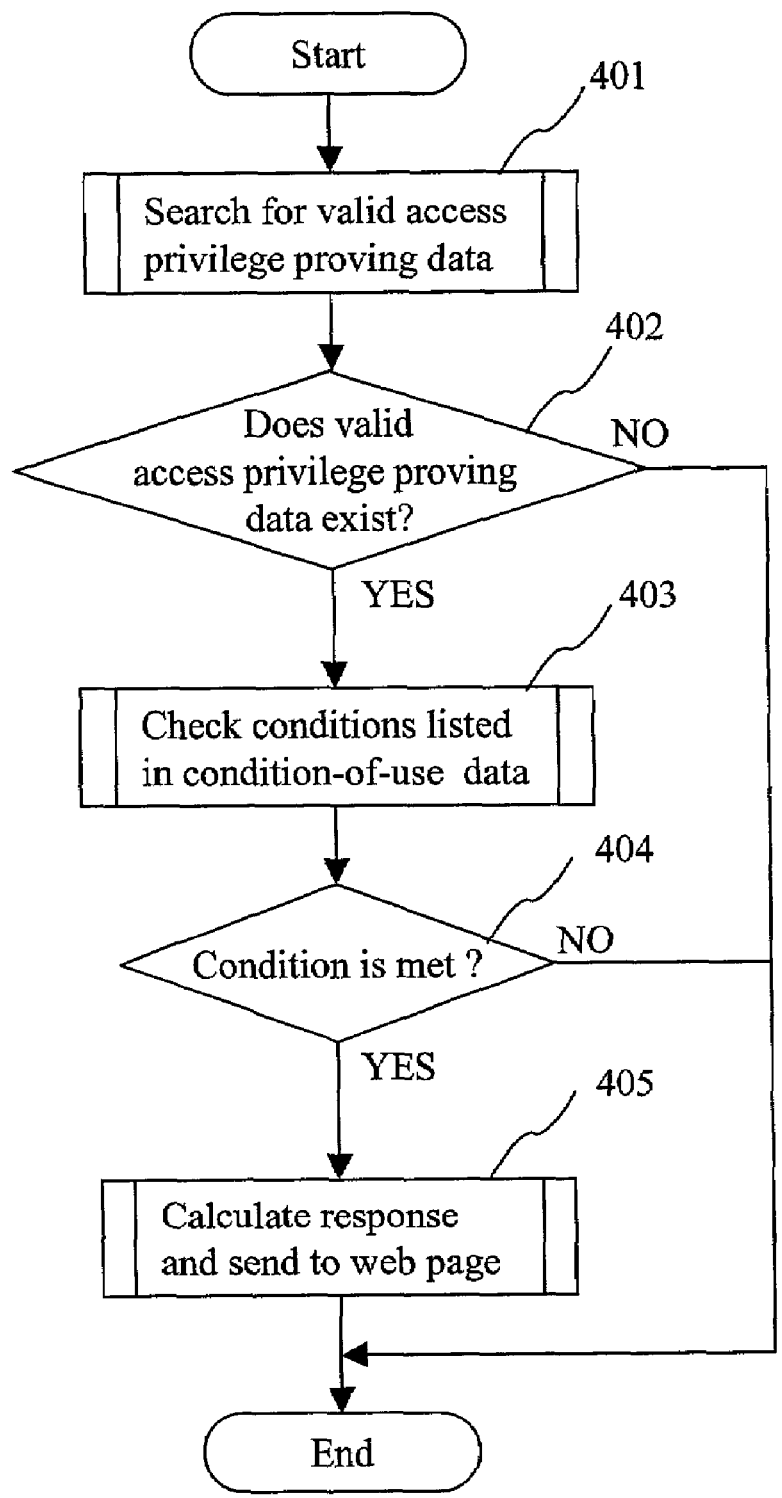
FIG. 4 is a flowchart illustrating the method of operations according to the first embodiment.

FIG. 4 is a flowchart showing operations of the access privilege prover 204 to which the challenge, RSA modulus, and public key are transferred. The procedure of generating a response that is executed by the access privilege prover 204 will be described with reference to this flowchart.

The access privilege proving controller 205 controls the operations of the access privilege prover 204. In step 401, the access privilege proving controller 205 searches the access privilege proving data storage unit 206 for the conditions-of-use data and access privilege proving data corresponding to the RSA modulus and public key received from the web server 101. A plurality of access privilege proving data with the RSA modulus, public key, and conditions-of-use data used in generating the access privilege proving data is stored in the access privilege proving data storage unit 206. In this step, the access privilege proving controller 205 searches for access privilege proving data and conditions-of-use data bound to the same RSA modulus and public key as that received from the web server 101.

If no access privilege proving data and conditions-of-use data corresponding to the data received from the web server 101 exists (No in 402), the process ends. In this case, a response is not returned to the web server 101.

If access privilege proving data and conditions-of-use data corresponding to the data received from the web server 101 exists (Yes in 402), the conditions-of-use evaluator 207 is called to determine in step 403 whether the conditions of use listed in the conditions-of-use data found in step 401 are satisfied.

If the conditions of use are not satisfied (No in 404), the process ends. In this case, a response is not returned to the web server 101. If the conditions of use are satisfied (Yes in 404), a response is calculated and transmitted in step 405 to the web server 101 via the web browser 202, and the process ends.

In step 405, the unique response generator 208 is called to calculate the response based on unique data assigned to the client. When calling the unique response generator 208, the challenge, RSA modulus, and public key transferred from the web server 101 and the conditions-of-use data found in step 401 are transferred to the unique response generator 208.

In the unique response generator 208, the unique response calculator 212 calls the unique operation executor 211 to obtain calculation results based on unique data stored in the unique data storage unit 210. The unique operation executor 211 performs a prescribed operation based on the unique data stored in the unique data storage unit 210, the RSA modulus and public key received from the web server 101, and the conditions-of-use data found in step 401. The unique operation executor 211 performs the calculation shown in Equation (11), where n is the RSA modulus received from the web server 101, e is the public key, L is the conditions-of-use data found in step 401, and u is the unique data stored in the unique data storage unit 210 to obtain the result F.

$$F = f(n|e|L|u) \quad (11)$$

Subsequently, the unique response calculator 212 calculates R' using Equation (12) from the result calculated by the unique operation executor 211, and the challenge C and RSA modulus n transferred from the web server 101.

$$R' = C^F \bmod n \quad (12)$$

After receiving the result R' of the calculation from the unique response generator 208, the access privilege proving controller 205 calls the response generator 209 to calculate the response R. This response is generated by executing the calculation shown in Equation (13) from the challenge C and RSA modulus n received from the web server 101, the result R' received from the unique response generator 208, and the access privilege proving data t found in step 401.

$$R = C^t R' \bmod n \quad (13)$$

In the present embodiment, the response check in step 305 is successful if there is a correct combination of the RSA modulus n and public key e assigned to the requested web page, unique data u assigned to the client, and access privilege proving data t and conditions-of-use data L indicating access privileges of that client. As a result of the successful finding in step 305, data for the requested web page is transferred to the client. If any part of this data combination is different, the result in step 305 will not be successful, and the client will not be able to obtain data for the requested web page.

In the present embodiment, the access privilege proving data is defined by Equation (10). Accordingly, the ability of someone to analyze the contents of the unique response generator 208 would create a security problem. If the result of Equation (11) were revealed, a third party could calculate the private key d corresponding to the RSA modulus n and the public key e. A third party learning the private key d could use the system dishonestly. Even without knowledge of Equation (11), disclosing the unique data u stored in the unique data storage unit 210 could lead anyone to calculate this Equation (11) and to ultimately calculate the private key d. To prevent this problem, measures must be taken to avoid a third party analysis of the calculation process and the internal memory of the unique response generator 208. It is necessary to take such measures as configuring the unique response generator 208 using tamper-resistant hardware or using software technology to make the analysis of programs and memory difficult, for example.

Since smart cards (IC cards possessing operating functions) are highly tamper-resistant hardware, configuring the unique response generator 208 using smart cards is an effective method. In this case, unique data is assigned to the smart cards rather than to the client. By carrying the smart cards and connecting them to a client, the user can use any client and still exercise the same access privileges. This method is even more user-friendly if the storage unit 206 is included in the smart card.

Figure 5:
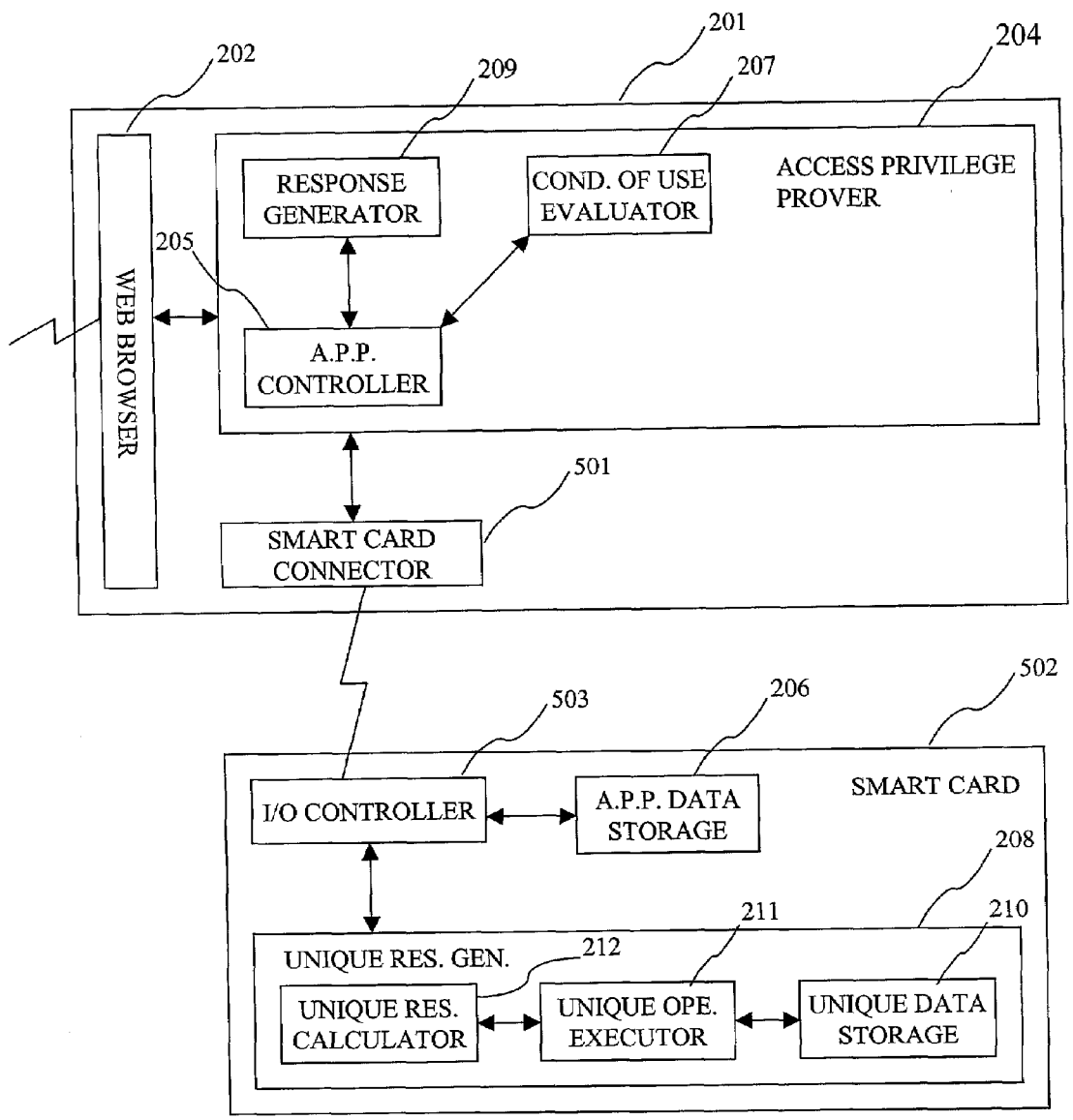
FIG. 5 is a block diagram showing a variation of the first embodiment.

FIG. 5 shows an example configuration of the client 201 when configuring the unique response generator 208 and access privilege proving data storage unit 206 with smart cards.

For convenience of this description, parts in FIG. 5 having the same function as those in FIG. 2 are designated by the same reference numerals, while new numbers are assigned to new parts not appearing in FIG. 2.

Unlike the configuration shown in FIG. 2, the unique response generator 208 and access privilege proving data storage unit 206 are included in a smart card 502 in the configuration of FIG. 5. The smart card 502 has an I/O controller 503 for controlling data input and output between the smart card 502 and client 201. The client 201 has a smart card connector 501 for connecting to the smart card 502 and controlling data input and output with the smart card. Since the remaining configuration in FIG. 5 is the same as that shown in FIG. 2, a description of these parts has been omitted.

Second Embodiment

The authentication technology according to a second embodiment of the present invention comprises a web server for providing web applications to clients, and clients using these web applications on the web server. Operations of the applications on the web server are controlled using script that is interpreted and executed on the server end.

The web server in the present embodiment employs a mechanism for authenticating access privileges according to the present invention. The timing at which the mechanism of access privilege authentication is called can be described in script, along with the RSA modulus and public key used by this access privilege authentication mechanism. During the process of interpreting and executing this script, the mechanism for access privilege authentication is called to verify that the client has access privileges. Before providing the client with specific functions of a web application, for example, it is possible to perform access privilege authentication for those functions in order to provide relevant functions only to clients confirmed to have proper access privileges.

When called, the mechanism of access privilege verification verifies whether the client has proper access privileges by performing a challenge/response exchange with the client. The challenge/response exchange is only successful when the client possesses access privilege proving data corresponding to an RSA modulus and public key specified for the access privilege authentication.

In the present embodiment, the client has a mechanism for authenticating access privileges according to the present invention. When the client receives a challenge from the web server, the client can generate and return a response. Each client in the present embodiment is assigned unique data. Access privilege proving data for special clients is generated from the private key corresponding to the RSA modulus and public key, the unique data assigned to the client, and conditions-of-use data describing conditions in which use of functions on web application is allowed the client. The conditions-of-use data includes starting and ending times and dates for the valid time period of the client's access privileges.

For example, an access privilege proving data t is generated according to Equation (10), where n is the RSA modulus, e the public key, d the private key corresponding to the n and e, u the unique data assigned to the client, and L the conditions-of-use data.

Figure 6:
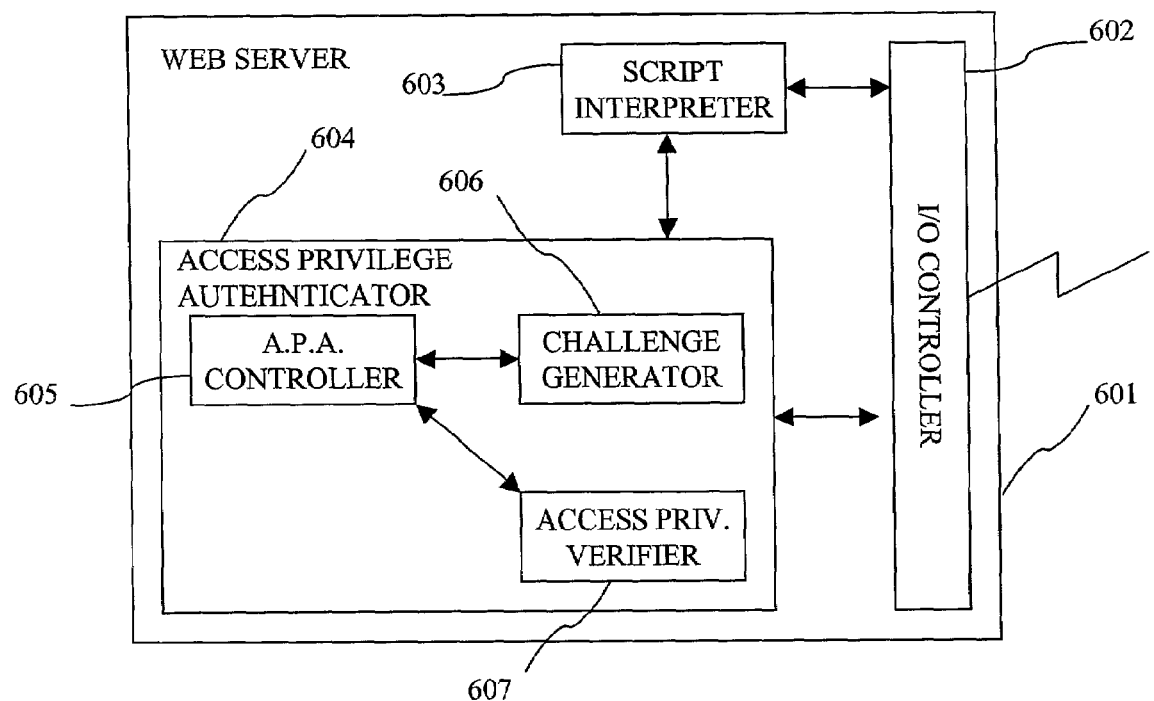
FIG. 6 is a block diagram showing the configuration of a web server according to a second embodiment of the present invention.

FIG. 6 shows the internal construction of a web server 601 according to the second embodiment of the present invention. The web server 601 includes an I/O controller 602, a script interpreter 603, and an access privilege authenticator 604.

The I/O controller 602 controls input received by the web server 601 from a client via a network and output transmitted from the web server 601 to a client via the network.

The script interpreter 603 retains script configuring a web application that is provided by the web server 601, interprets and executes the script in response to a request from a client, and provides results to the client via the I/O controller 602. When interpreting and executing the script, the script interpreter 603 can call the access privilege authenticator 604 to verify whether the client has proper access privileges.

The access privilege authenticator 604 determines whether a client has proper access privileges in response to a call from the script interpreter 603 and returns the result to the script interpreter 603. During the determination process, the access privilege authenticator 604 communicates with the client via the I/O controller 602.

The access privilege authenticator 604 comprises an access privilege authentication controller 605, a challenge generator 606, and an access privilege verifier 607.

The access privilege authentication controller 605 controls the overall process for testing whether the client has proper user privileges.

The access privilege authentication control unit 605 determines whether the client has access privileges according to a challenge/response exchange conducted between the web server and the client. The challenge generator 606 generates a challenge that is transmitted to the client.

The access privilege verifier 607 determines whether the response received from the client has a prescribed relationship with the challenge generated by the challenge generator 606, the access privilege proving data transmitted by the client along with the response, and the RSA modulus and public key specified by the script interpreter 603, and outputs the result of this determination.

Figure 7:
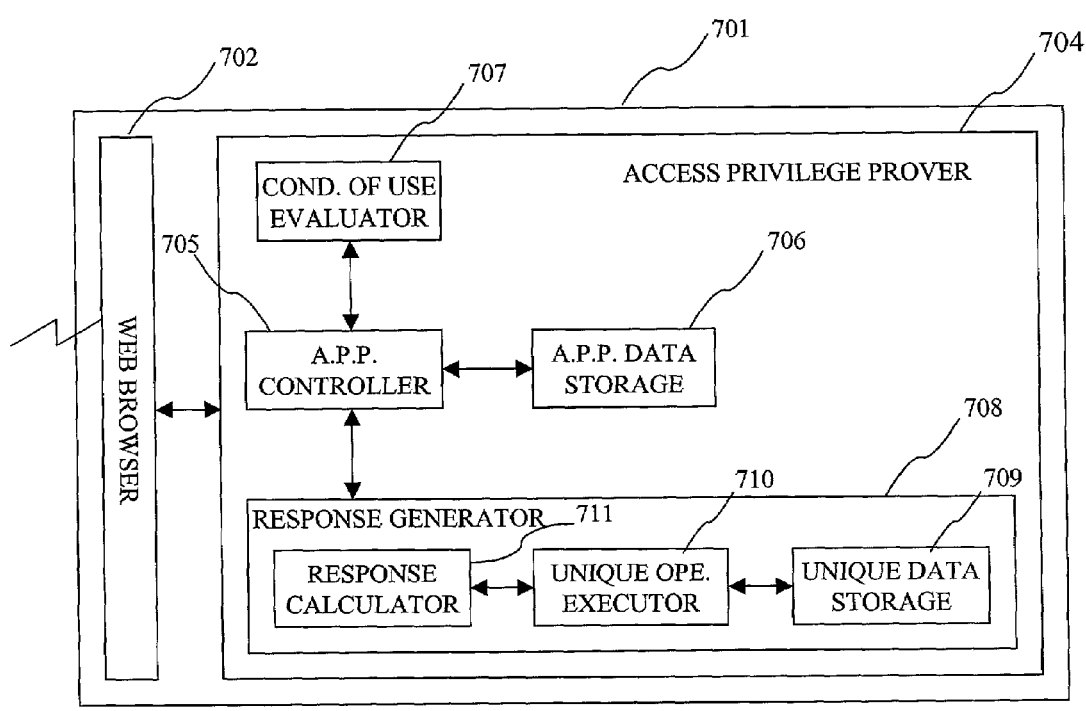
FIG. 7 is a block diagram showing the configuration of a client according to the second embodiment.

FIG. 7 shows the internal configuration of a client 701 according to the second embodiment of the present invention. The client 701 includes a web browser 702 and an access privilege prover 704.

The web browser 702 controls input to the client received from the web server via a network and output transmitted from the client to the web server via the network. The web browser 702 also serves to transmit requests for web applications to the web server and to process web pages received from the web server.

When a challenge is received from the web server 601 via the web browser 702 for authenticating access privileges, the access privilege prover 704 calculates a response for proving its own access privileges and sends this response to the web server 601 via the web browser 702, together with access privilege proving data.

The access privilege prover 704 comprises an access privilege proving controller 705, an access privilege proving data storage unit 706, a conditions-of-use evaluator 707, and a response generator 708.

The access privilege proving controller 705 controls overall calculations of the response for proving access privileges of the client.

The access privilege proving data storage unit 706 stores access privilege proving data possessed by the client and is capable of storing multiple access privilege proving data. Each separate access privilege proving data is stored along with its RSA modulus, public key, and conditions-of-use data used in generating access privilege proving data.

The conditions-of-use evaluator 707 determines whether or not the conditions of use described by the conditions-of-use data are met. The conditions-of-use data in the present embodiment describe the starting and ending time and date for the valid period of the corresponding access privilege proving data. The conditions-of-use evaluator 707 includes a function for determining whether the current time falls within this period.

The response generator 708 generates a response to be transmitted to the web server 601.

The response generator 708 comprises a unique data storage unit 709, a unique operation executor 710, and a response calculator 711.

The unique data storage unit 709 stores unique data assigned to the client.

The unique operation executor 710 is provided with a built-in cryptographic hash function f(•) possessed universally by all clients. The unique operation executor 710 executes this hash operation using the unique data stored in the unique data storage unit 709.

The response calculator 711 calculates the response to be sent to the web server 601 using the results from the unique operation executor 710.

Part of the script retained by the web server 601 describes calling the mechanism for access privilege authentication. The RSA modulus and public key used for access privilege authentication are described in the script. When reaching the part of the script for calling the mechanism for access privilege authentication during the process of interpreting and executing the script, the script interpreter 603 calls the access privilege authenticator 604 for confirming whether the client 701 has access privileges corresponding to the RSA modulus and public key specified in the script.

The access privilege authenticator 604 verifies whether the client 701 has access privileges corresponding to the specified RSA modulus and public key and sends the result of this check to the script interpreter 603.

Figure 8:
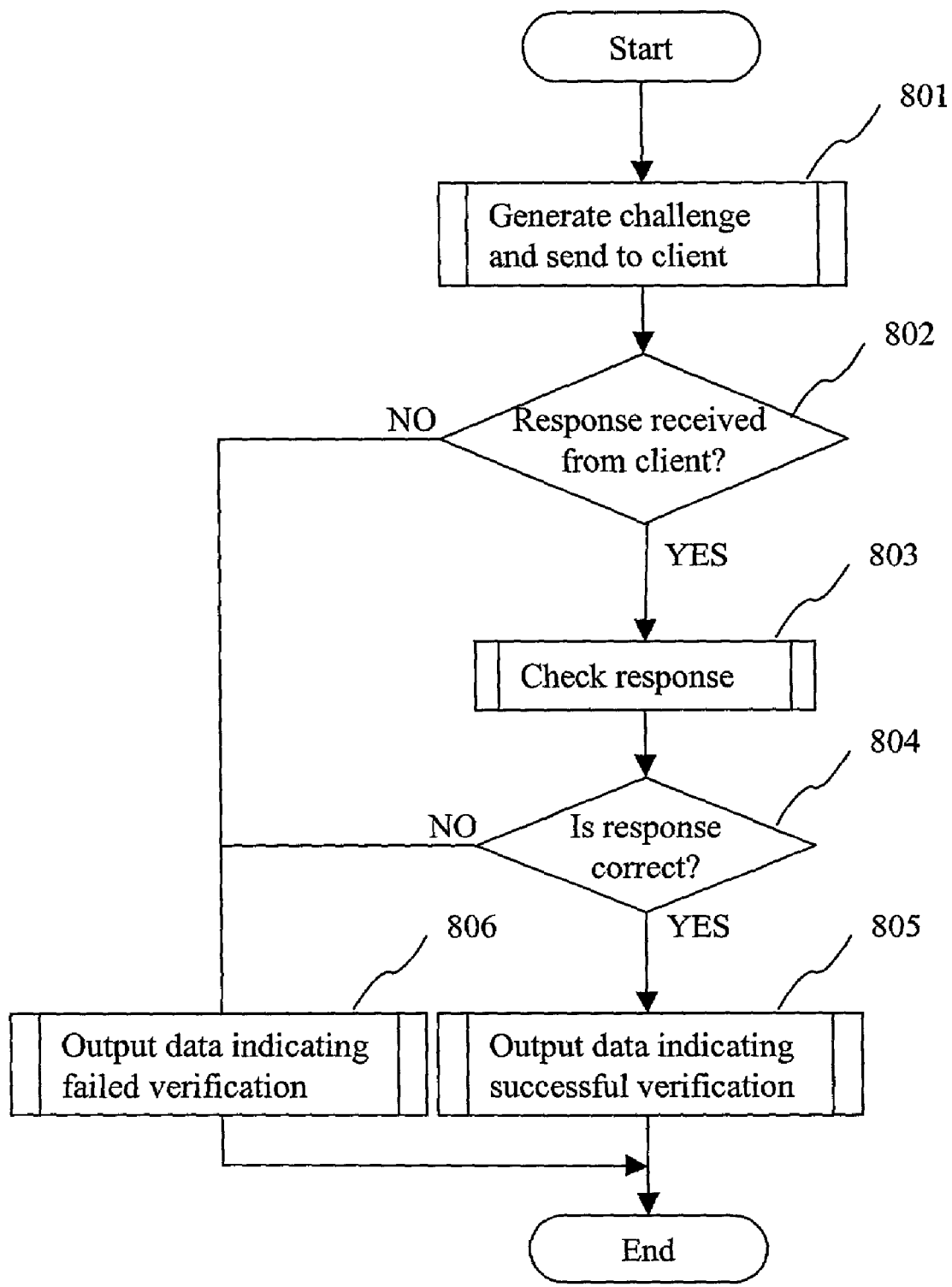
FIG. 8 is a flowchart illustrating the method of operations according to the second embodiment.

FIG. 8 is a flowchart showing the operations performed in the access privilege authenticator 604 when called by the script interpreter 603. The procedure for verifying access privileges executed by the access privilege authenticator 604 will be described with reference to this flowchart.

The access privilege authentication controller 605 controls operations of the access privilege authenticator 604. The access privilege authentication controller 605 first calls the challenge generator 606 to generate a challenge and transmits this challenge to the client 701 via the I/O controller 602 in step 801. The access privilege authentication controller 605 also transmits the RSA modulus and public key used for access privilege authentication to the client 701 along with the challenge.

Subsequently, the access privilege authenticator 604 waits for a response and access privilege proving data to be sent from the client 701 via the I/O controller 602. If no response and access privilege proving data has been received when a fixed interval has passed since the challenge was transmitted (No in 802), data indicating that verification of access privileges has failed is output in step 806, and the process ends.

When a response and access privilege proving data is received from the client 701 (Yes in 802), the access privilege authentication controller 605 calls the access privilege verifier 607 in step 803 to verify whether the response is correct. Here, the access privilege verifier 607 verifies whether Equation (6) is satisfied when the challenge sent to the client 701 in step 801 is C, the response received in step 802 is R, the access privilege proving data is t, and the RSA modulus used for access privilege authentication is n. If Equation (6) is satisfied (Yes in 804), data indicating that access privileges have been successfully authenticated is output in step 805, and the process ends. If Equation (6) is not satisfied (No in 804), data indicating that authentication of access privileges has failed is output in step 806, and the process ends.

Meanwhile, after receiving a challenge, RSA modulus, and public key from the web server 601 via the web browser 702, the client 701 transfers this data to the access privilege prover 704 to generate a response, then sends the response to the web server 601 via the web browser 702, together with the access privilege proving data corresponding to the RSA modulus and public key.

Figure 9:
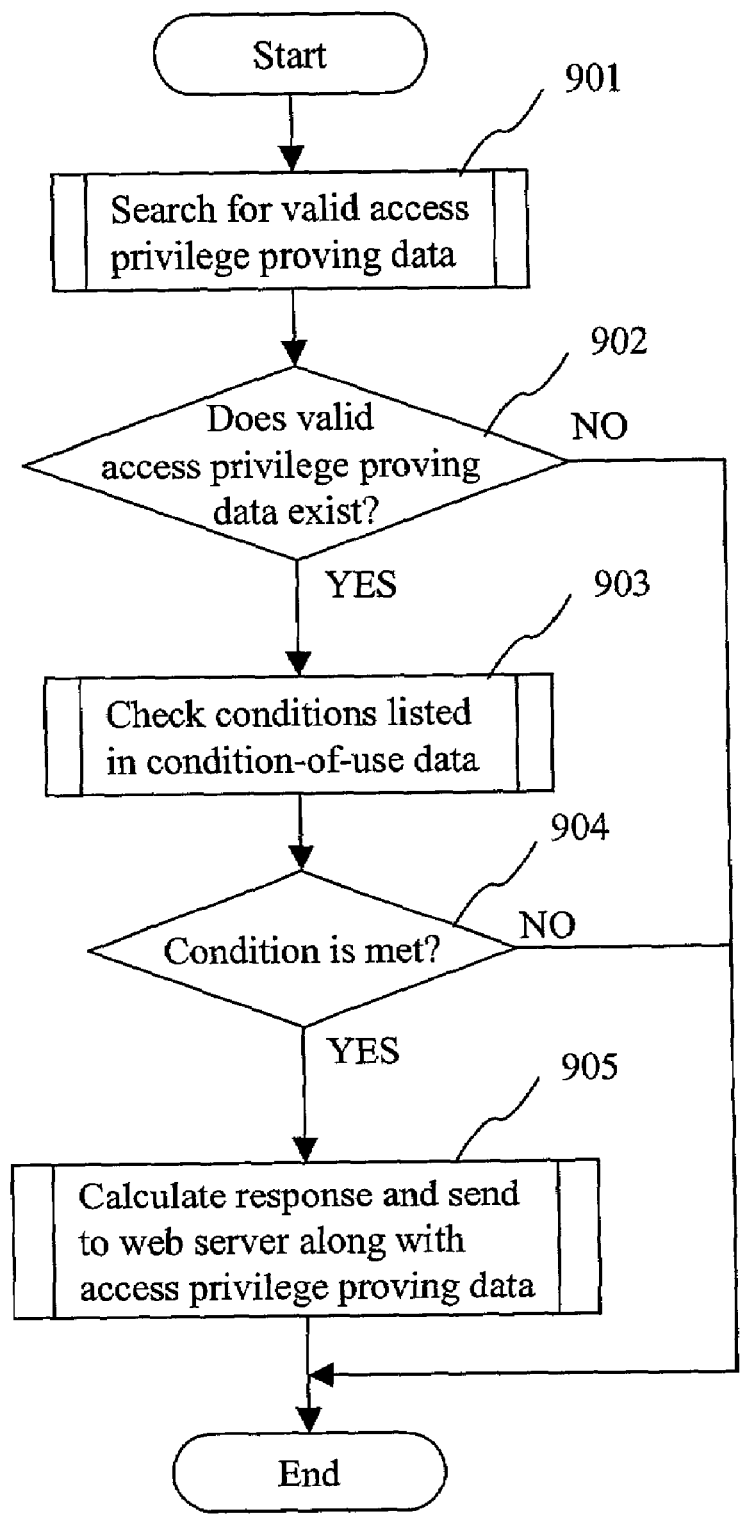
FIG. 9 is a flowchart illustrating the method of operations according to the second embodiment.

FIG. 9 is a flowchart showing operations of the access privilege prover 704, which generates a response after receiving the challenge, RSA modulus, and public key. The procedure of generating a response that is executed by the access privilege prover 704 will be described with reference to this flowchart.

The access privilege proving controller 705 controls the operations of the access privilege prover 704. In step 901, the access privilege proving controller 705 searches the access privilege proving data storage unit 706 for the conditions-of-use data and access privilege proving data corresponding to the RSA modulus and public key received from the web server 601. A plurality of access privilege proving data bound to the RSA modulus, public key, and conditions-of-use data used in generating the access privilege proving data is stored in the access privilege proving data storage unit 706. In this step, the access privilege proving controller 705 searches for access privilege proving data and conditions-of-use data bound to the same RSA modulus and public key as that received from the web server 601.

If no access privilege proving data and conditions-of-use data corresponding to the data received from the web server 601 exists (No in 902), the process ends. In this case, a response is not returned to the web server 601.

If access privilege proving data and conditions-of-use data corresponding to the data received from the web server 601 exists (Yes in 902), the conditions-of-use evaluator 707 is called to determine in step 903 whether the conditions of use listed in the conditions-of-use data found in step 901 are satisfied.

If the conditions of use are not satisfied (No in 904), the process ends. In this case, a response is not returned to the web server 601. If the conditions of use are satisfied (Yes in 904), a response is calculated in step 905 and transmitted to the web server 601 via the web browser 702, along with the access privilege proving data found in step 901, and the process ends.

In step 905, the response generator 708 is called to calculate the response based on unique data assigned to the client. When calling the response generator 708, the challenge, RSA modulus, and public key received from the web server 601 are transferred to the response generator 708.

In the response generator 708, the response calculator 711 calls the unique operation executor 710 to obtain calculation results based on unique data stored in the unique data storage unit 709. The unique operation executor 710 performs a prescribed operation based on the unique data stored in the unique data storage unit 709 and the RSA modulus and public key received from the web server 601. The unique operation executor 710 performs the calculation shown in Equation (11) to obtain the result F, where n is the RSA modulus received from the web server 601, e is the public key, L is the conditions-of-use data found in step 901, and u is the unique data stored in the unique data storage unit 709.

Subsequently, the response calculator 711 calculates the response R using Equation (14) from the result found by the unique operation executor 710, and the challenge C and RSA modulus n transferred from the web server 601.

$$R = C^F \bmod n \qquad (14)$$

In the present embodiment, the response check in step 803 is successful if there is a correct combination of the RSA modulus n and public key e specified by the script interpreter 603, unique data u assigned to the client, and access privilege proving data t and conditions-of-use data L indicating access privileges of that client. If any part of this data combination is different, the result in step 803 will not be successful. The results of the verification are returned to the script interpreter 603. Operations of the web application can be modified according to these results. For example, it is possible to transmit different HTML (HyperText Markup Language) documents to the client when the access privilege authentication succeeds and when it fails. Further, various web languages, such as XML (Extensible Markup Language), can be used in place of HTML documents.

In the present embodiment, the access privilege proving data is defined by Equation (10). Accordingly, the ability to analyze the contents of the response generator 708 would create a security problem. If the result of Equation (11) were revealed, a third party could calculate the private key d corresponding to the RSA modulus n and the public key e. A third party learning the private key d could use the system dishonestly. Even without knowledge of Equation (11), disclosing of the unique data u stored in the unique data storage unit 709 could lead anyone to calculate this Equation (11) and to ultimately calculate the private key d. To prevent this problem, measures must be taken to avoid a third party analysis of the calculation process and the internal memory in the response generator 708. It is necessary to take such measures as configuring the response generator 708 using tamper-resistant hardware or using software technology to make the analysis of programs and memory difficult, for example.

As in the first embodiment, it is preferable to implement the response generator 708 using a smart card.

Figure 10:
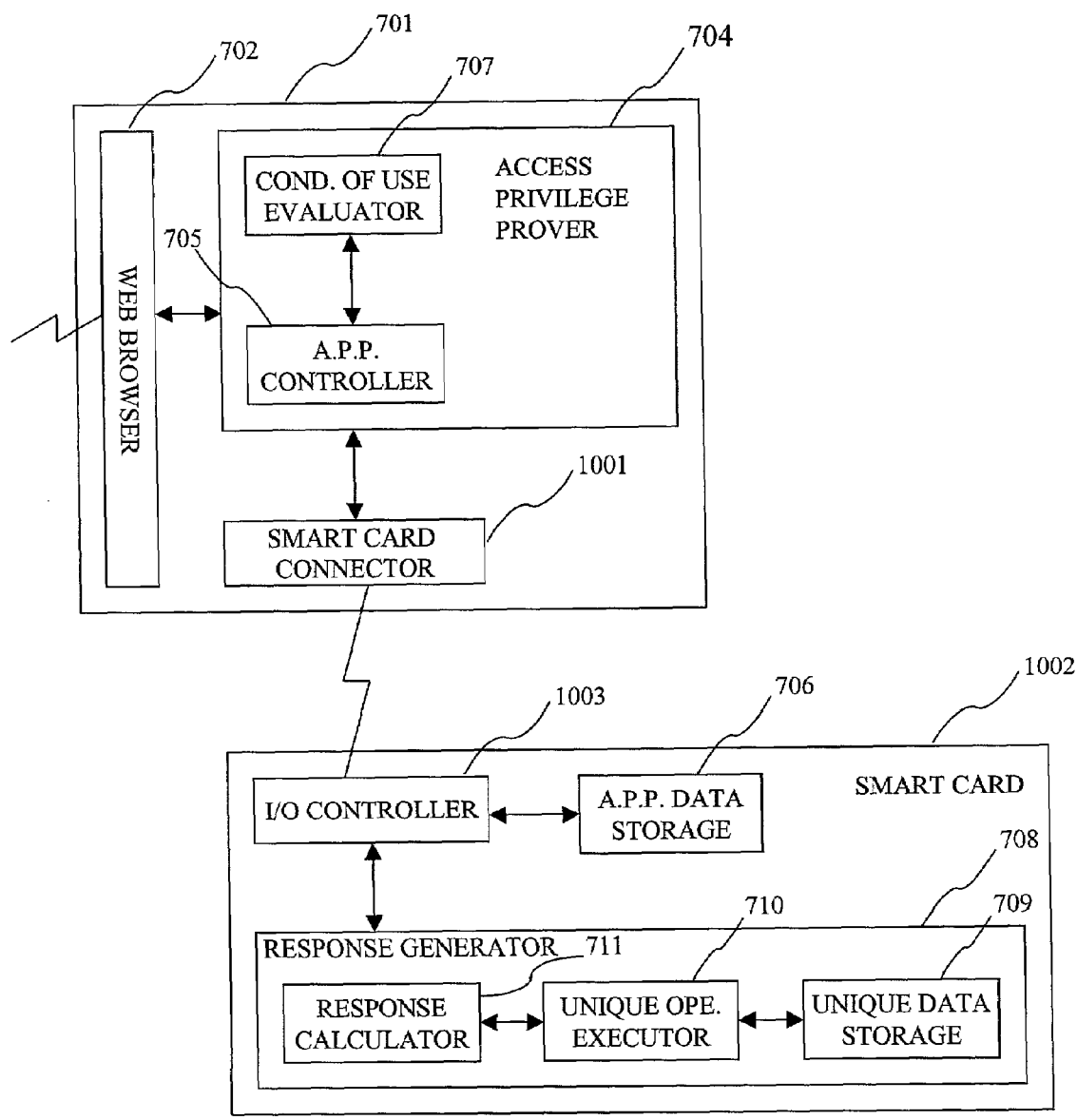
FIG. 10 is a block diagram showing a variation of the second embodiment.

FIG. 10 shows an example configuration of the client 701 when configuring the response generator 708 and access privilege proving data storage unit 706 with a smart card.

For convenience of this description, parts in FIG. 10 having the same function as those in FIG. 7 are designated by the same reference numerals, while new numbers are assigned to new parts not appearing in FIG. 7.

Unlike the configuration shown in FIG. 7, the response generator 708 and access privilege proving data storage unit 706 are included in a smart card 1002 in the configuration of FIG. 10. The smart card 1002 has an I/O controller 1003 for controlling data input and output between the smart card 1002 and client 701. The client 701 has a smart card connector 1001 for connecting to the smart card 1002 and controlling data input and output with the smart card. Since the remaining configuration in FIG. 10 is the same as that shown in FIG. 7, a description of these parts has been omitted.

In the embodiments of the present invention described above, access privilege authentication is not performed using user account data. Therefore, there is no need to maintain user account data, thereby preventing the service history of users being known on the server end.

As described above, clients are authenticated without using user accounts in the present invention, thereby reducing the cost of maintaining user accounts and protecting user privacy.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A system comprising:
a server that provides service to a client;
the server further comprising:
a public-key storage unit that stores a public key assigned to the service;
a challenge generator that generates a challenge to be sent from the server to the client after the server receives a request for the service from the client;
an access privilege verifier that verifies whether a prescribed relationship exists between the challenge and a response, the response being corresponding the challenge and received from the client; and
the client that requests the service from the server, the client comprises:
an unique operation executer that executes a first unique operation assigned to the client;
an access privilege proving data storage unit that stores access privilege proving data, the access privilege proving data being created from a private key corresponding to a public key assigned to the requested service and result of a second unique operation;
a response generator that generates the response to the challenge, the challenge being received from the server;
wherein the response is calculated based on the first unique operation and the access privilege proving data, and
wherein a valid response is not calculated unless the first unique operation coincides with the second unique operation.

2. The system according to claim 1, wherein the server sends the challenge to the client with a condition for using the server.

3. The system according to claim 1, wherein the unique operation is used under conditions that a common cryptographic hash function is assigned to all client and different data is assigned to each client.

4. A system as recited in claim 1, wherein the server is a web server that supplies a web application to the client; and the public key is assigned to an individual web page.

5. A system as recited in claim 1, wherein the server is a web server that supplies a web application to clients; and the public key is assigned to groups of web pages and is to verify the access privilege of the client for the web page when the server receives a request from the client to access a web page in one of the groups of web pages.

6. A server as recited in claim 1, further comprising:
script interpreter for interpreting script designed to control the contents of service.

7. A client that requests service to a server, comprising:
an unique operation executer that executes a first unique operation assigned to the client;
an access privilege proving data storage unit that stores access privilege proving data, the access privilege proving data being created from a private key corresponding to a public key assigned to the requested service and result of a second unique operation;
a response generator that generates the response to the challenge, the challenge being received from the server; and
wherein the response is calculated based on the first unique operation and the access privilege proving data,
further a valid response is not calculated unless the first unique operation coincides with the second unique operation.

8. The client according to claim 7, wherein the access privilege providing data storage unit is included in a portable device.

* * * * *